(12) United States Patent
Crounse et al.

(10) Patent No.: US 12,307,988 B2
(45) Date of Patent: May 20, 2025

(54) METHODS FOR GLOBALLY APPLYING VOLTAGES TO THE DISPLAY PIXELS OF ELECTRO-OPTIC DISPLAYS

(71) Applicant: E INK CORPORATION, Billerica, MA (US)

(72) Inventors: Kenneth R. Crounse, Somerville, MA (US); Ana L. Lattes, Newton, MA (US); Teck Ping Sim, Acton, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 18/069,354

(22) Filed: Dec. 21, 2022

(65) Prior Publication Data

US 2023/0197024 A1 Jun. 22, 2023

Related U.S. Application Data

(60) Provisional application No. 63/292,458, filed on Dec. 21, 2021.

(51) Int. Cl.
*G09G 3/34* (2006.01)
*G02F 1/167* (2019.01)
(Continued)

(52) U.S. Cl.
CPC ............. *G09G 3/344* (2013.01); *G02F 1/167* (2013.01); *G02F 1/16766* (2019.01);
(Continued)

(58) Field of Classification Search
CPC ............. G09G 3/344; G09G 2201/121; G09G 2310/0202; G09G 2310/0254;
(Continued)

(56) References Cited

U.S. PATENT DOCUMENTS 4,272,596 A * 6/1981 Harbour .................. G02F 1/167
252/62.51 R
4,418,346 A 11/1983 Batchelder
(Continued)

OTHER PUBLICATIONS

European Patent Office, "International Search Report and Written Opinion", PCT/US2022/053593, Mar. 7, 2023. Mar. 7, 2023.
(Continued)

*Primary Examiner* — Sanghyuk Park
(74) *Attorney, Agent, or Firm* — Jason P. Colangelo

(57) ABSTRACT

A method of driving an electro-optic display including a layer of electro-optic material disposed between a common electrode and a backplane including an array of pixel electrodes, each coupled to a transistor including a source, gate, and drain electrode. The gate electrode is coupled to a gate line, the source electrode is coupled to a scan line, and the drain electrode is coupled to the pixel electrode. A controller provides time-dependent voltages to the gate, scan, and common electrodes, including a common electrode that is the maximum voltage the controller is capable of applying, and a scan line voltage to every pixel that is the maximum voltage the controller is capable of applying. A gate voltage sufficient to activate the pixel transistor to the gate of every pixel transistor is applied, thereby applying voltage potential across the electro-optic material.

20 Claims, 5 Drawing Sheets

(51) Int. Cl.
    *G02F 1/16766*    (2019.01)
    *G02F 1/1685*     (2019.01)
(52) U.S. Cl.
    CPC ...... *G02F 1/1685* (2019.01); *G02F 2201/121* (2013.01); *G09G 2310/0202* (2013.01); *G09G 2310/0254* (2013.01); *G09G 2310/08* (2013.01); *G09G 2320/0247* (2013.01); *G09G 2320/0257* (2013.01)
(58) Field of Classification Search
    CPC . G09G 2310/08; G02F 1/167; G02F 1/16766; G02F 1/1685
    See application file for complete search history.

(56) References Cited

U.S. PATENT DOCUMENTS

| | | |
|---|---|---|
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II et al. |
| 5,930,026 A | 7/1999 | Jacobson et al. |
| 6,054,071 A | 4/2000 | Mikkelsen, Jr. |
| 6,055,091 A | 4/2000 | Sheridon et al. |
| 6,097,531 A | 8/2000 | Sheridon |
| 6,128,124 A | 10/2000 | Silverman |
| 6,130,774 A | 10/2000 | Albert et al. |
| 6,137,467 A | 10/2000 | Sheridon et al. |
| 6,144,361 A | 11/2000 | Gordon, II |
| 6,147,791 A | 11/2000 | Sheridon |
| 6,172,798 B1 | 1/2001 | Albert et al. |
| 6,184,856 B1 | 2/2001 | Gordon, II |
| 6,225,971 B1 | 5/2001 | Gordon, II |
| 6,241,921 B1 | 6/2001 | Jacobson et al. |
| 6,271,823 B1 | 8/2001 | Gordon, II |
| 6,301,038 B1 | 10/2001 | Fitzmaurice et al. |
| 6,445,489 B1 | 9/2002 | Jacobson et al. |
| 6,504,524 B1 | 1/2003 | Gates et al. |
| 6,512,354 B2 | 1/2003 | Jacobson et al. |
| 6,531,997 B1 | 3/2003 | Gates et al. |
| 6,672,921 B1 | 1/2004 | Liang et al. |
| 6,753,999 B2 | 6/2004 | Zehner et al. |
| 6,788,449 B2 | 9/2004 | Liang et al. |
| 6,825,970 B2 | 11/2004 | Goenaga et al. |
| 6,866,760 B2 | 3/2005 | Paolini, Jr. et al. |
| 6,870,657 B1 | 3/2005 | Fitzmaurice et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,982,178 B2 | 1/2006 | LeCain et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,023,420 B2 | 4/2006 | Comiskey et al. |
| 7,034,783 B2 | 4/2006 | Gates et al. |
| 7,061,166 B2 | 6/2006 | Kuniyasu |
| 7,061,662 B2 | 6/2006 | Chung et al. |
| 7,072,095 B2 | 7/2006 | Liang et al. |
| 7,075,502 B1 | 7/2006 | Drzaic et al. |
| 7,116,318 B2 | 10/2006 | Amundson et al. |
| 7,116,466 B2 | 10/2006 | Whitesides et al. |
| 7,119,772 B2 | 10/2006 | Amundson et al. |
| 7,144,942 B2 | 12/2006 | Zang et al. |
| 7,170,670 B2 | 1/2007 | Webber |
| 7,177,066 B2 | 2/2007 | Chung et al. |
| 7,193,625 B2 | 3/2007 | Danner et al. |
| 7,202,847 B2 | 4/2007 | Gates |
| 7,236,291 B2 | 6/2007 | Kaga et al. |
| 7,242,514 B2 | 7/2007 | Chung et al. |
| 7,259,744 B2 | 8/2007 | Arango et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,321,459 B2 | 1/2008 | Masuda et al. |
| 7,327,511 B2 | 2/2008 | Whitesides et al. |
| 7,408,699 B2 | 8/2008 | Wang et al. |
| 7,411,719 B2 | 8/2008 | Paolini, Jr. et al. |
| 7,420,549 B2 | 9/2008 | Jacobson et al. |
| 7,453,445 B2 | 11/2008 | Amundson |
| 7,492,339 B2 | 2/2009 | Amundson |
| 7,528,822 B2 | 5/2009 | Amundson et al. |
| 7,535,624 B2 | 5/2009 | Amundson et al. |
| 7,545,358 B2 | 6/2009 | Gates et al. |
| 7,583,251 B2 | 9/2009 | Arango et al. |
| 7,602,374 B2 | 10/2009 | Zehner et al. |
| 7,612,760 B2 | 11/2009 | Kawai |
| 7,679,599 B2 | 3/2010 | Kawai |
| 7,679,813 B2 | 3/2010 | Liang et al. |
| 7,679,814 B2 | 3/2010 | Paolini, Jr. et al. |
| 7,683,606 B2 | 3/2010 | Kang et al. |
| 7,688,297 B2 | 3/2010 | Zehner et al. |
| 7,715,088 B2 | 5/2010 | Liang et al. |
| 7,729,039 B2 | 6/2010 | LeCain et al. |
| 7,733,311 B2 | 6/2010 | Amundson et al. |
| 7,733,335 B2 | 6/2010 | Zehner et al. |
| 7,787,169 B2 | 8/2010 | Abramson et al. |
| 7,839,564 B2 | 11/2010 | Whitesides et al. |
| 7,859,742 B1 | 12/2010 | Chiu et al. |
| 7,952,557 B2 | 5/2011 | Amundson |
| 7,956,841 B2 | 6/2011 | Albert et al. |
| 7,982,479 B2 | 7/2011 | Wang et al. |
| 7,999,787 B2 | 8/2011 | Amundson et al. |
| 8,009,348 B2 | 8/2011 | Zehner et al. |
| 8,077,141 B2 | 12/2011 | Duthaler et al. |
| 8,125,501 B2 | 2/2012 | Amundson et al. |
| 8,139,050 B2 | 3/2012 | Jacobson et al. |
| 8,174,490 B2 | 5/2012 | Whitesides et al. |
| 8,243,013 B1 | 8/2012 | Sprague et al. |
| 8,274,472 B1 | 9/2012 | Wang et al. |
| 8,289,250 B2 | 10/2012 | Zehner et al. |
| 8,300,006 B2 | 10/2012 | Zhou et al. |
| 8,305,341 B2 | 11/2012 | Arango et al. |
| 8,314,784 B2 | 11/2012 | Ohkami et al. |
| 8,373,649 B2 | 2/2013 | Low et al. |
| 8,384,658 B2 | 2/2013 | Albert et al. |
| 8,432,387 B2 | 4/2013 | Lee |
| 8,456,414 B2 | 6/2013 | Lin et al. |
| 8,462,102 B2 | 6/2013 | Wong et al. |
| 8,514,168 B2 | 8/2013 | Chung et al. |
| 8,537,105 B2 | 9/2013 | Chiu et al. |
| 8,558,783 B2 | 10/2013 | Wilcox et al. |
| 8,558,785 B2 | 10/2013 | Zehner et al. |
| 8,558,786 B2 | 10/2013 | Lin |
| 8,558,855 B2 | 10/2013 | Sprague et al. |
| 8,576,164 B2 | 11/2013 | Sprague et al. |
| 8,576,259 B2 | 11/2013 | Lin et al. |
| 8,593,396 B2 | 11/2013 | Amundson et al. |
| 8,605,032 B2 | 12/2013 | Liu et al. |
| 8,643,595 B2 | 2/2014 | Chung et al. |
| 8,665,206 B2 | 3/2014 | Lin et al. |
| 8,681,191 B2 | 3/2014 | Yang et al. |
| 8,730,153 B2 | 5/2014 | Sprague et al. |
| 8,810,525 B2 | 8/2014 | Sprague |
| 8,928,562 B2 | 1/2015 | Gates et al. |
| 8,928,570 B2 | 1/2015 | Kim et al. |
| 8,928,575 B2 | 1/2015 | Moriya et al. |
| 8,928,641 B2 | 1/2015 | Chiu et al. |
| 8,976,444 B2 | 3/2015 | Zhang et al. |
| 9,013,394 B2 | 4/2015 | Lin |
| 9,019,197 B2 | 4/2015 | Lin |
| 9,019,198 B2 | 4/2015 | Lin et al. |
| 9,019,318 B2 | 4/2015 | Sprague et al. |
| 9,082,352 B2 | 7/2015 | Cheng et al. |
| 9,171,508 B2 | 10/2015 | Sprague et al. |
| 9,218,773 B2 | 12/2015 | Sun et al. |
| 9,224,338 B2 | 12/2015 | Chan et al. |
| 9,224,342 B2 | 12/2015 | Sprague et al. |
| 9,224,344 B2 | 12/2015 | Chung et al. |
| 9,230,492 B2 | 1/2016 | Harrington et al. |
| 9,251,736 B2 | 2/2016 | Lin et al. |
| 9,262,973 B2 | 2/2016 | Wu et al. |
| 9,269,311 B2 | 2/2016 | Amundson |
| 9,279,906 B2 | 3/2016 | Kang |
| 9,299,294 B2 | 3/2016 | Lin et al. |

(56) References Cited

U.S. PATENT DOCUMENTS

| | | | |
|---|---|---|---|
| 9,373,289 B2 | 6/2016 | Sprague et al. |
| 9,390,066 B2 | 7/2016 | Smith et al. |
| 9,390,661 B2 | 7/2016 | Chiu et al. |
| 9,412,314 B2 | 8/2016 | Amundson et al. |
| 9,460,666 B2 | 10/2016 | Sprague et al. |
| 9,495,918 B2 | 11/2016 | Harrington et al. |
| 9,501,981 B2 | 11/2016 | Lin et al. |
| 9,513,743 B2 | 12/2016 | Sjodin et al. |
| 9,514,667 B2 | 12/2016 | Lin |
| 9,542,895 B2 | 1/2017 | Gates et al. |
| 9,564,088 B2 | 2/2017 | Wilcox et al. |
| 9,612,502 B2 | 4/2017 | Danner et al. |
| 9,620,048 B2 | 4/2017 | Sim et al. |
| 9,620,067 B2 | 4/2017 | Harrington et al. |
| 9,672,766 B2 | 6/2017 | Sjodin |
| 9,691,333 B2 | 6/2017 | Cheng et al. |
| 9,721,495 B2 | 8/2017 | Harrington et al. |
| 9,792,861 B2 | 10/2017 | Chang et al. |
| 9,792,862 B2 | 10/2017 | Hung et al. |
| 9,966,018 B2 | 5/2018 | Gates et al. |
| 10,037,735 B2 | 7/2018 | Amundson |
| 10,229,641 B2 | 3/2019 | Yang et al. |
| 10,319,313 B2 | 6/2019 | Harris et al. |
| 10,339,876 B2 | 7/2019 | Lin et al. |
| 10,444,553 B2 | 10/2019 | Laxton |
| 10,573,257 B2 | 2/2020 | Emelie et al. |
| 10,672,350 B2 | 6/2020 | Amundson et al. |
| 2003/0102858 A1 | 6/2003 | Jacobson et al. |
| 2004/0246562 A1 | 12/2004 | Chung et al. |
| 2005/0253777 A1 | 11/2005 | Zehner et al. |
| 2007/0091418 A1 | 4/2007 | Danner et al. |
| 2007/0103427 A1 | 5/2007 | Zhou et al. |
| 2007/0176912 A1 | 8/2007 | Beames et al. |
| 2008/0024429 A1 | 1/2008 | Zehner |
| 2008/0024482 A1 | 1/2008 | Gates et al. |
| 2008/0112040 A1* | 5/2008 | Suwabe ............... G02F 1/167 359/296 |
| 2008/0136774 A1 | 6/2008 | Harris et al. |
| 2008/0303780 A1 | 12/2008 | Sprague et al. |
| 2009/0174651 A1 | 7/2009 | Jacobson et al. |
| 2009/0322721 A1 | 12/2009 | Zehner et al. |
| 2010/0194733 A1 | 8/2010 | Lin et al. |
| 2010/0194789 A1 | 8/2010 | Lin et al. |
| 2010/0220121 A1 | 9/2010 | Zehner et al. |
| 2010/0265561 A1 | 10/2010 | Gates et al. |
| 2011/0063314 A1 | 3/2011 | Chiu et al. |
| 2011/0115774 A1* | 5/2011 | Yamazaki ............. G09G 3/344 345/107 |
| 2011/0175875 A1 | 7/2011 | Lin et al. |
| 2011/0193840 A1 | 8/2011 | Amundson et al. |
| 2011/0193841 A1 | 8/2011 | Amundson et al. |
| 2011/0199671 A1 | 8/2011 | Amundson et al. |
| 2011/0221740 A1 | 9/2011 | Yang et al. |
| 2012/0001957 A1 | 1/2012 | Liu et al. |
| 2012/0098740 A1 | 4/2012 | Chiu et al. |
| 2012/0249508 A1* | 10/2012 | Hsu ....................... G09G 3/344 345/204 |
| 2013/0063333 A1 | 3/2013 | Arango et al. |
| 2013/0249782 A1 | 9/2013 | Wu et al. |
| 2014/0009817 A1 | 1/2014 | Wilcox et al. |
| 2014/0204012 A1 | 7/2014 | Wu et al. |
| 2014/0240210 A1 | 8/2014 | Wu et al. |
| 2014/0253425 A1 | 9/2014 | Zalesky et al. |
| 2014/0293398 A1 | 10/2014 | Wang et al. |
| 2015/0005720 A1 | 1/2015 | Zang et al. |
| 2015/0262255 A1 | 9/2015 | Khajehnouri et al. |
| 2016/0012710 A1 | 1/2016 | Lu et al. |
| 2016/0140910 A1 | 5/2016 | Amundson |
| 2016/0180777 A1 | 6/2016 | Lin et al. |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991).

Wood, D., "An Electrochromic Renaissance?" Information Display, 18(3), 24 (Mar. 2002).

Bach, Udo. et al., "Nanomaterials-Based Electrochromics for Paper-Quality Displays", Adv. Mater, vol. 14, No. 11, pp. 845-848, (Jun. 5, 2002).

Hayes, R.A. et al., "Video-Speed Electronic Paper Based on Electrowetting", Nature, vol. 425, No. 25, pp. 383-385 (Sep. 2003).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 729-1730, Paper AMD4-4 (2001).

Ota, I. et al., "Developments in Electrophoretic Displays", Proceedings of the SID, 18, 243 (1977).

* cited by examiner

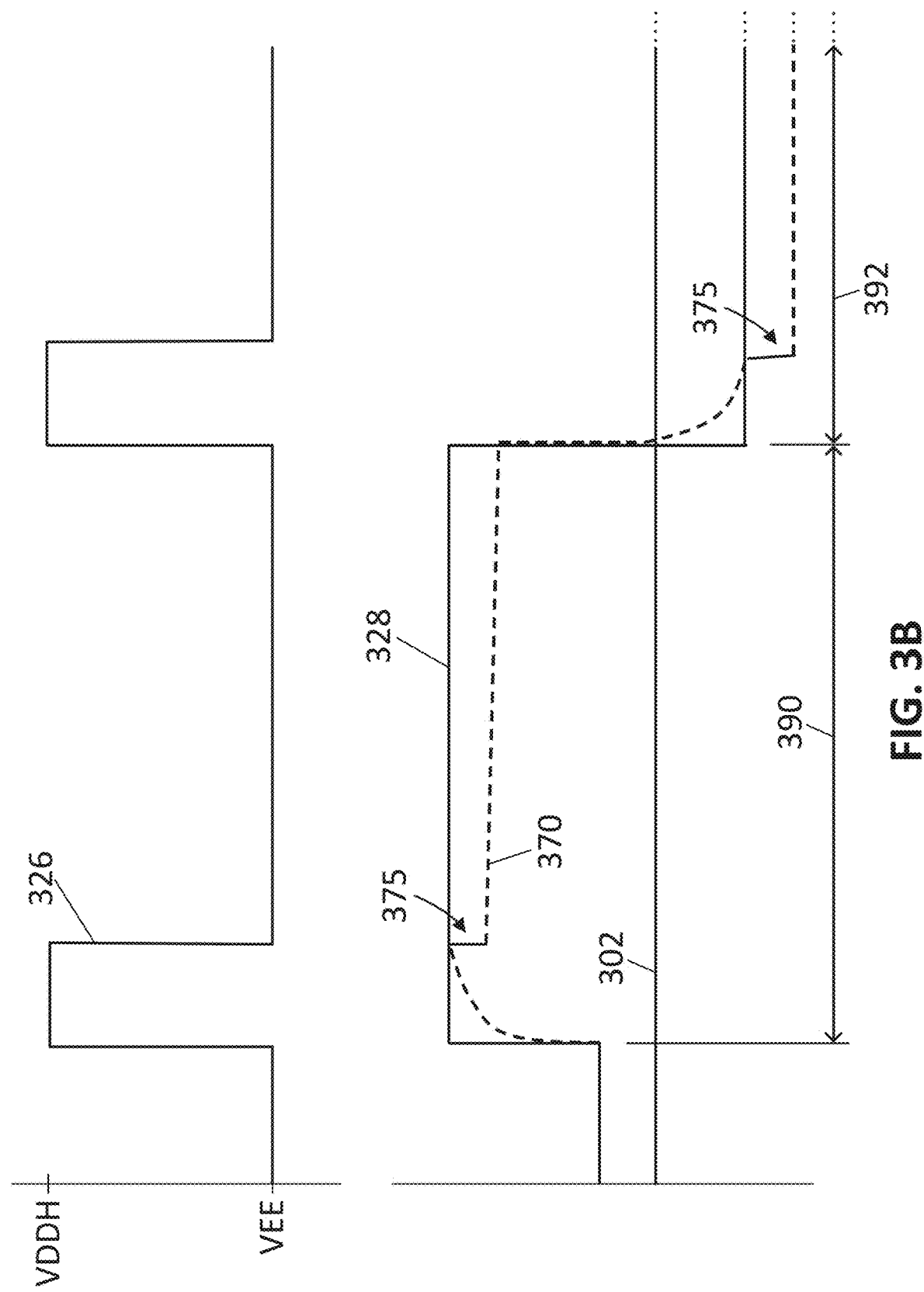

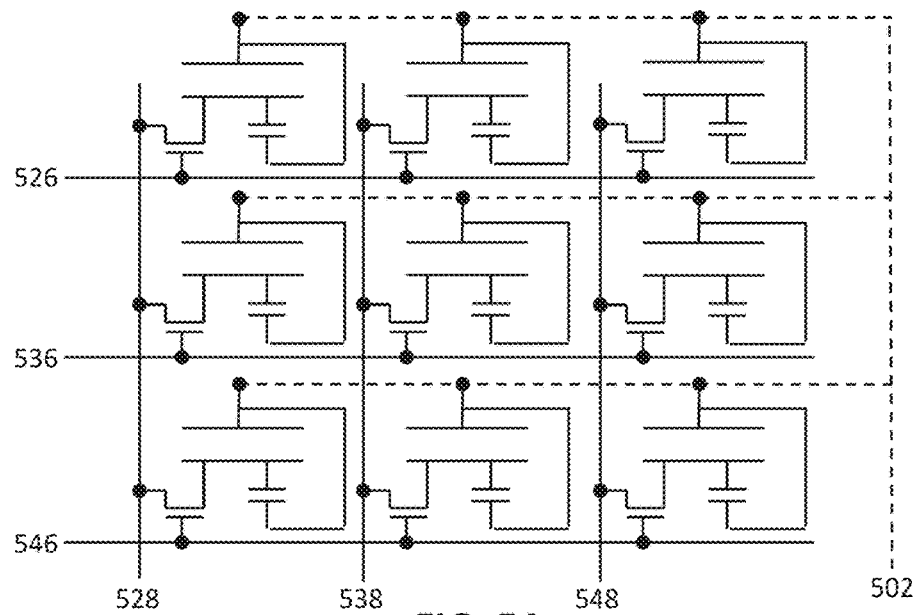
FIG. 5A
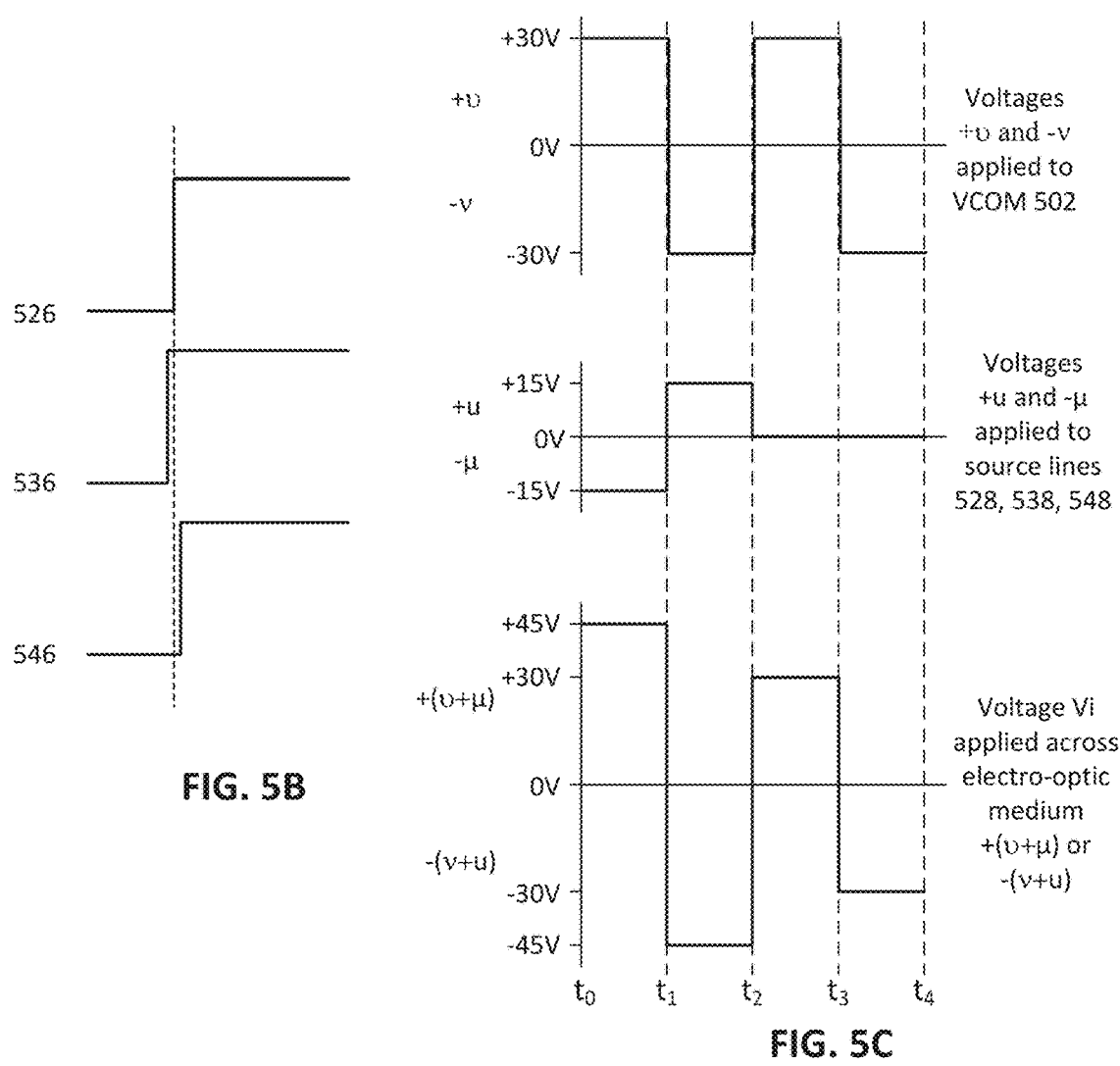
FIG. 5B
FIG. 5C

METHODS FOR GLOBALLY APPLYING VOLTAGES TO THE DISPLAY PIXELS OF ELECTRO-OPTIC DISPLAYS

CROSS-REFERENCE TO RELATED APPLICATIONS

This application claims priority to U.S. Provisional Patent Application No. 63/292,458 filed on Dec. 22, 2021, the entire contents of which are incorporated herein. Further, the entire contents of any patent, published application, or other published work referenced herein are incorporated by reference in their entireties.

FIELD OF THE INVENTION

This invention relates to methods for driving electro-optic displays. More specifically, this invention relates to driving methods for globally apply voltages to the display pixels at approximately the same time.

BACKGROUND OF THE INVENTION

Electro-optic displays typically have a backplane provided with a plurality of pixel electrodes each of which defines one pixel of the display; conventionally, a single common electrode extending over a large number of pixels, and normally the whole display is provided on the opposed side of the electro-optic medium. The individual pixel electrodes may be driven directly (i.e., a separate conductor may be provided to each pixel electrode) or the pixel electrodes may be driven in an active matrix manner which will be familiar to those skilled in backplane technology.

In active matrix addressing, each display pixel is attached to a transistor and capacitor that actively maintain the pixel's state while other pixels are being addressed. For some applications, it is desirable to have a large voltage globally applied across the ink stack. For such applications, voltages can be applied to the top plane, which is a reference commonly shared by all the pixels. This method of switching the module is called global top-plane switching.

U.S. Pat. No. 10,037,735, assigned to E Ink Corporation, describes globally driving an active matrix display through the top plane by temporarily switching the connection of each storage capacitor's counter-electrode from the top plane to a ground reference separate from the top plane. The storage capacitors then act as a virtual ground during global driving when one or more voltages are applied to the top plane.

However, this method cannot apply additional voltage to the bottom electrode due to the configuration of the storage capacitor. Hence, without further modification, the largest voltage potential that can be generated across the ink is limited to the maximum voltage that can be applied to the top plane. Further, if higher voltages are applied to the top plane in this configuration, coupling can occur and the virtual ground may not hold, causing undesired charging or discharging of the storage capacitor.

Other complications can arise based on active matrix addressing which drives each row select line at a different time. Accordingly, when using global top-plane switching for an active matrix, all pixels experience the voltage applied to the top-plane at different times, with the longest time difference occurring between the application of the first and last row select lines. This can result in non-uniform application of voltages across the ink stack, which is contrary to the intended purpose for using global top-plane switching.

SUMMARY OF THE INVENTION

Accordingly, there exists a need for driving methods to perform top plane switching more effectively and efficiently. In particular, there is therefore a need for systems and methods for performing global top-plane switching that are capable of applying high voltages across the ink stack while addressing all of the transistors at the same or about the same time.

In one aspect, the subject matter presented herein provides for a method for driving an electro-optic display having a plurality of display pixels. The method can include turning on all the pixel transistors at the same, or about the same, time and supplying the appropriate voltages to create a desired voltage potential across the ink stack. The subject matter presented herein also enables driving a display with voltages higher than the capabilities of a conventional driver device without exceeding the driver's voltage specifications or requiring a substantial redesign of the driver.

In one aspect, the invention features a method of driving an electro-optic display including a layer of electro-optic material disposed between a common electrode and a backplane. The backplane includes an array of pixel electrodes. Each pixel electrode is coupled to a pixel transistor including a source electrode, a gate electrode, and a drain electrode. The gate electrode is coupled to a gate line, the source electrode is coupled to a source line, and the drain electrode is coupled to the pixel electrode. A controller provides time-dependent voltages to the gate line, the source line, and the common electrode. The method of driving includes applying a first voltage to the common electrode. The first voltage has a first amplitude that is the maximum voltage the controller is capable of applying to the common electrode. The method of driving also includes applying a second voltage to the source line of every pixel where the second voltage has a second amplitude that is the maximum voltage the controller is capable of applying to the source line of every pixel, and the second voltage has a polarity opposite of the first voltage. The method of driving also includes concurrently applying a high level gate line voltage sufficient to activate the pixel transistor to the gate line of every pixel transistor, thereby applying a third voltage across the electro-optic material. The third voltage has a third amplitude sufficient to drive the optical state of the display to a first extreme optical state.

In some embodiments, the first voltage has a positive polarity and the second voltage has a negative polarity. In some embodiments, the first voltage has a negative polarity and the second voltage has a positive polarity. In some embodiments, the third voltage has a magnitude of substantially 30V. In some embodiments, the third voltage has a magnitude of substantially 45V. In some embodiments, the first extreme optical state is one of white and black.

In some embodiments, the method further includes concurrently applying a low level gate line voltage sufficient to deactivate the pixel transistor to the gate line of every pixel transistor, applying a fourth voltage to the common electrode, wherein the fourth voltage has a fourth amplitude that is the maximum voltage the controller is capable of applying to the common electrode, applying a fifth voltage to the source line of every pixel, wherein the fifth voltage has a fifth amplitude that is the maximum voltage the controller is capable of applying to the source line of every pixel, and wherein the fifth voltage has a polarity opposite of the second voltage and the fourth voltage, and concurrently applying the high level gate line voltage sufficient to activate the pixel transistor to the gate line of every pixel transistor, thereby applying a sixth voltage across the electro-optic material, wherein the sixth voltage has a sixth amplitude sufficient to drive the optical state of the display to a second extreme optical state.

In some embodiments, the second extreme optical state is one of white and black, and wherein the second extreme optical state is the opposite of the first extreme optical state. In some embodiments, the sixth voltage has a magnitude of substantially 30V. In some embodiments, the sixth voltage has a magnitude of substantially 45V.

In another aspect the invention features an electro-optic display including a light-transmissive common electrode, a backplane including an array of pixel electrodes, and a layer of electro-optic material disposed between the common electrode and the array of pixel electrodes. Each pixel electrode is coupled to a pixel transistor including a source electrode, a gate electrode, and a drain electrode, and the gate electrode is coupled to a gate line, the source electrode is coupled to a source line, and the drain electrode is coupled to the pixel electrode. The electro-optic display further includes a controller capable of applying time-dependent voltages to the gate line, the source line, and the common electrode. The controller is configured to (i) apply a first voltage to the common electrode. The first voltage has a first amplitude that is the maximum voltage the controller is capable of applying to the common electrode; (ii) apply a second voltage to the source line of every pixel, wherein the second voltage has a second amplitude that is the maximum voltage the controller is capable of applying to the source line of every pixel. The second voltage has a polarity opposite of the first voltage; and (iii) concurrently apply a high level gate line voltage sufficient to activate the pixel transistor to the gate line of every pixel transistor, thereby applying a third voltage across the electro-optic material. The third voltage has a third amplitude sufficient to drive the optical state of the display to a first extreme optical state.

In some embodiments, the first voltage has a positive polarity and the second voltage has a negative polarity. In some embodiments, the first voltage has a negative polarity and the second voltage has a positive polarity. In some embodiments, the third voltage has a magnitude of substantially 30V. In some embodiments, the third voltage has a magnitude of substantially 45V. In some embodiments, the first extreme optical state is one of white and black.

In some embodiments, the controller is further configured to (i) concurrently apply a low level gate line voltage sufficient to deactivate the pixel transistor to the gate line of every pixel transistor, (ii) apply a fourth voltage to the common electrode, where the fourth voltage has a fourth amplitude that is the maximum voltage the controller is capable of applying to the common electrode, (iii) apply a fifth voltage to the source line of every pixel, where the fifth voltage has a fifth amplitude that is the maximum voltage the controller is capable of applying to the source line of every pixel, and wherein the fifth voltage has a polarity opposite of the second voltage and the fourth voltage, and (iv) concurrently apply the high level gate line voltage sufficient to activate the pixel transistor to the gate line of every pixel transistor, thereby applying a sixth voltage across the electro-optic material, where the sixth voltage has a sixth amplitude sufficient to drive the optical state of the display to a second extreme optical state.

In some embodiments, the second extreme optical state is one of white and black, and wherein the second extreme optical state is the opposite of the first extreme optical state. In some embodiments, the sixth voltage has a magnitude of substantially 30V. In some embodiments, the sixth voltage has a magnitude of substantially 45V.

BRIEF DESCRIPTION OF DRAWINGS

FIG. 3B is a diagram showing two illustrative frames during which positive and negative voltages are applied to a display pixel in accordance with the subject matter presented herein.

FIG. 5A shows a schematic of an exemplary electro-optic display including a plurality of display pixels positioned in rows and columns in accordance with the subject matter presented herein.

FIG. 5B shows a signal timing diagram of row select lines of an exemplary electro-optic display in accordance with the subject matter presented herein.

FIG. 5C shows a signal diagram of applied voltages in accordance with the subject matter presented herein.

DETAILED DESCRIPTION OF THE INVENTION

Figure 2:
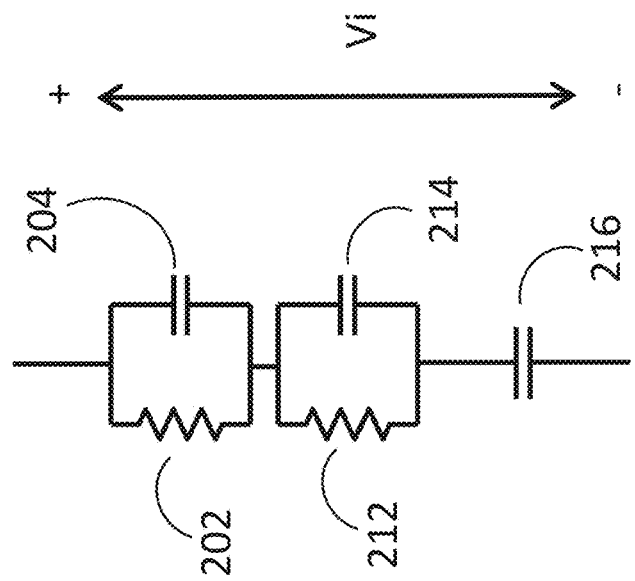
FIG. 2 shows a circuit model of the electro-optic imaging layer.

The present invention relates to methods for driving electro-optic displays, especially bistable electro-optic displays, and to apparatus for use in such methods. More specifically, this invention relates to driving methods which may allow for reduced "ghosting" and edge effects, and reduced flashing in such displays. This invention is especially, but not exclusively, intended for use with particle-based electrophoretic displays in which one or more types of electrically charged particles are present in a fluid and are moved through the fluid under the influence of an electric field to change the appearance of the display.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example, the aforementioned white and dark blue states. The term "monochrome" may be used hereinafter to denote a drive scheme which only drives pixels to their two extreme optical states with no intervening gray states.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Much of the discussion below will focus on methods for driving one or more pixels of an electro-optic display through a transition from an initial gray level to a final gray level (which may or may not be different from the initial gray level). The term "waveform" will be used to denote the entire voltage against time curve used to effect the transition from one specific initial gray level to a specific final gray level. Typically such a waveform will comprise a plurality of waveform elements; where these elements are essentially rectangular (i.e., where a given element comprises application of a constant voltage for a period of time); the elements may be called "pulses" or "drive pulses". The term "drive scheme" denotes a set of waveforms sufficient to effect all possible transitions between gray levels for a specific display. A display may make use of more than one drive scheme; for example, the aforementioned U.S. Pat. No. 7,012,600 teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes." It is also possible, as described in several of the aforementioned MEDEOD applications, to use more than one drive scheme simultaneously in different areas of the same display, and a set of drive schemes used in this manner may be referred to as "a set of simultaneous drive schemes."

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 7,075,502 and 7,839,564.

(h) Applications of displays; see for example U.S. Pat. Nos. 7,312,784; 8,009,348;

(i) Non-electrophoretic displays, as described in U.S. Pat. No. 6,241,921 and U.S. Patent Application Publication No. 2015/0277160; and applications of encapsulation and microcell technology other than displays; see for example U.S. Patent Application Publications Nos. 2015/0005720 and 2016/0012710; and (j) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0070032; 2007/0076289; 2007/0091418; 2007/0103427; 2007/0176912; 2007/0296452; 2008/0024429; 2008/0024482; 2008/0136774; 2008/0169821; 2008/0218471; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2016/0071465; 2016/0078820; 2016/0093253; 2016/0140910; and 2016/0180777.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Publication No. 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display." In a microcell electrophoretic display, the charged particles and the suspending fluid are not encapsulated within microcapsules but instead are retained within a plurality of cavities formed within a carrier medium, e.g., a polymeric film. See, for example, International Application Publication No. WO 02/01281, and published U.S. Application No. 2002/0075556, both assigned to Sipix Imaging, Inc.

Many of the aforementioned E Ink and MIT patents and applications also contemplate microcell electrophoretic displays and polymer-dispersed electrophoretic displays. The term "encapsulated electrophoretic displays" can refer to all such display types, which may also be described collectively as "microcavity electrophoretic displays" to generalize across the morphology of the walls.

Another type of electro-optic display is an electro-wetting display developed by Philips and described in Hayes, R. A., et al., "Video-Speed Electronic Paper Based on Electrowetting," Nature, 425, 383-385 (2003). It is shown in U.S. Pat. No. 7,420,549, that such electro-wetting displays can be made bistable.

Other types of electro-optic materials may also be used. Of particular interest, bistable ferroelectric liquid crystal displays (FLCs) are known in the art and have exhibited remnant voltage behavior.

Although electrophoretic media may be opaque (since, for example, in many electrophoretic media, the particles substantially block transmission of visible light through the display) and operate in a reflective mode, some electrophoretic displays can be made to operate in a so-called "shutter mode" in which one display state is substantially opaque and one is light-transmissive. See, for example, the patents U.S. Pat. Nos. 6,130,774 and 6,172,798, and 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

A high-resolution display may include individual pixels which are addressable without interference from adjacent pixels. One way to obtain such pixels is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. When the non-linear element is a transistor, the pixel electrode may be connected to the drain of the transistor, and this arrangement will be assumed in the following description, although it is essentially arbitrary and the pixel electrode could be connected to the source of the transistor. In high-resolution arrays, the pixels may be arranged in a two-dimensional array of rows and columns, such that any specific pixel is uniquely defined by the intersection of one specified row and one specified column. The sources of all the transistors in each column may be connected to a single column electrode, while the gates of all the transistors in each row may be connected to a single row electrode; again the assignment of sources to rows and gates to columns may be reversed if desired.

The display may be written in a row-by-row manner. The row electrodes are connected to a row driver, which may apply to a selected row electrode a voltage such as to ensure that all the transistors in the selected row are conductive, while applying to all other rows a voltage such as to ensure that all the transistors in these non-selected rows remain non-conductive. The column electrodes are connected to column drivers, which place upon the various column electrodes voltages selected to drive the pixels in a selected row to their desired optical states. (The aforementioned voltages are relative to a common front electrode which may be provided on the opposed side of the electro-optic medium from the non-linear array and extends across the whole display. As in known in the art, voltage is relative and a measure of a charge differential between two points. One voltage value is relative to another voltage value. For example, zero voltage ("0V") refers to having no voltage differential relative to another voltage.) After a pre-selected interval known as the "line address time," a selected row is deselected, another row is selected, and the voltages on the column drivers are changed so that the next line of the display is written.

However, in use, certain waveforms may produce a remnant voltage to pixels of an electro-optic display, and as evident from the discussion above, this remnant voltage produces several unwanted optical effects and is in general undesirable.

As presented herein, a "shift" in the optical state associated with an addressing pulse refers to a situation in which a first application of a particular addressing pulse to an electro-optic display results in a first optical state (e.g., a first gray tone), and a subsequent application of the same addressing pulse to the electro-optic display results in a second optical state (e.g., a second gray tone). Remnant voltages may give rise to shifts in the optical state because the voltage applied to a pixel of the electro-optic display during application of an addressing pulse includes the sum of the remnant voltage and the voltage of the addressing pulse.

A "drift" in the optical state of a display over time refers to a situation in which the optical state of an electro-optic display changes while the display is at rest (e.g., during a period in which an addressing pulse is not applied to the display). Remnant voltages may give rise to drifts in the optical state because the optical state of a pixel may depend on the pixel's remnant voltage, and a pixel's remnant voltage may decay over time.

As discussed above, "ghosting" refers to a situation in which, after the electro-optic display has been rewritten, traces of the previous image(s) are still visible. Remnant voltages may give rise to "edge ghosting," a type of ghosting in which an outline (edge) of a portion of a previous image remains visible. This type of artifact can be caused by an inter-pixel effect so-called "blooming." For example, in both monochrome and color systems there is a tendency for the electric field generated by a pixel electrode to affect an area of the electro-optic medium wider than that of the pixel electrode itself so that, in effect, one pixel's optical state spreads out into parts of the areas of adjacent pixels.

Further, in some instances driving adjacent pixels brings about a final optical state in the area between the pixels that differs from the optical state reached by either of the adjacent pixels themselves. This final optical state in the area between the adjacent pixels is caused by an electric field experienced in the inter-pixel region that is the average of the electric fields applied to the adjacent pixels. It has been found that edge ghosting can be mitigated by driving the electro-optic display with DC imbalanced waveforms.

However, the DC imbalanced waveforms may produce a remnant voltage. In addition, use of DC imbalanced waveforms can result in polarization kick-back which is a change in the optical state of an electro-optic medium occurring a short period after the medium ceases to be driven. This "kick-back" or "self-erasing" is a phenomenon observed in some electro-optic displays. See, for example, Ota, I., et al., "Developments in Electrophoretic Displays", Proceedings of the SID, 18, 243 (1977), where self-erasing was reported in an unencapsulated electrophoretic display whereby, shortly after the voltage applied across the electro-optic medium is no longer applied, the electro-optic medium may at least partially reverse its optical state. For example, a pixel driven to black may revert to a dark gray in a short period of time after the pixel is deselected. In some cases, a reverse voltage which may be larger than the operating voltage can be observed to occur across the electrodes, often leading electrode damage.

Other events can undesirably affect the optical state of the display pixels. For example, inter-pixel cross-talk, where addressing one pixel affects the optical state of neighboring pixels, can lead to a difference in the amplitude of the voltage potential across the electro-optic medium versus the voltage potential created between the data and VCOM lines that is applied to the electro-optic medium. Cross-talk can result from current leakage through elements of the display backplane or through the electro-optic medium in contact with the array of display pixels on the backplane. One leakage source is finite current flow through pixel transistors that are in the off state. For example, voltage driven to a data line intended for one display pixel can charge up neighboring pixel transistors of pixels in unselected rows because of off state current leakage. Further, although each pixel typically includes a storage capacitor to maintain the pixel's voltage while other pixels are being addressed, there is some decay in the pixel voltage due to current leakage.

An Exemplary EPD

Figure 1:
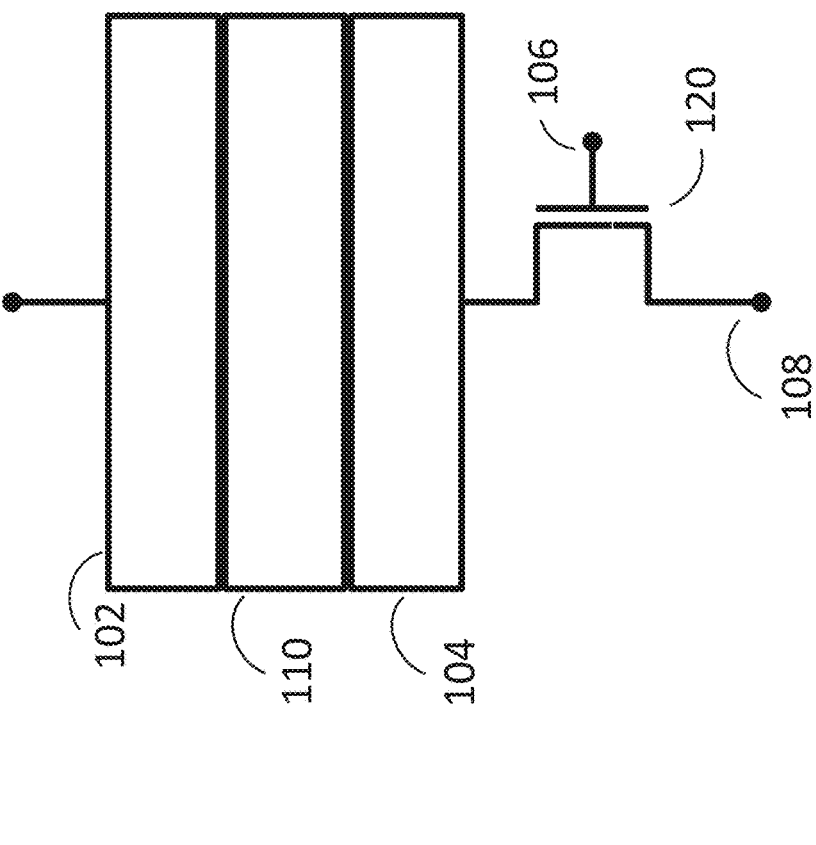
FIG. 1 is a circuit diagram representing an electrophoretic display.

FIG. 1 shows a schematic of a pixel 100 of an electro-optic display in accordance with the subject matter submitted herein. Pixel 100 may include an imaging film 110. In some embodiments, imaging film 110 may be bistable. In some embodiments, imaging film 110 may include, without limitation, an encapsulated electrophoretic imaging film, which may include, for example, charged pigment particles.

Imaging film 110 may be disposed between a front electrode 102 and a rear electrode 104. Front electrode 102 may be formed between the imaging film and the front of the display. In some embodiments, front electrode 102 may be transparent. In some embodiments, front electrode 102 may be formed of any suitable transparent material, including, without limitation, indium tin oxide (ITO). Rear electrode 104 may be formed opposite a front electrode 102. In some embodiments, a parasitic capacitance (not shown) may be formed between front electrode 102 and rear electrode 104.

Pixel 100 may be one of a plurality of pixels. The plurality of pixels may be arranged in a two-dimensional array of rows and columns to form a matrix, such that any specific pixel is uniquely defined by the intersection of one specified row and one specified column. In some embodiments, the matrix of pixels may be an "active matrix," in which each pixel is associated with at least one non-linear circuit element 120. The non-linear circuit element 120 may be coupled between back-plate electrode 104 and an addressing electrode 108. In some embodiments, non-linear element 120 may include a diode and/or a transistor, including, without limitation, a MOSFET. The drain (or source) of the MOSFET may be coupled to back-plate electrode 104, the source (or drain) of the MOSFET may be coupled to addressing electrode 108, and the gate of the MOSFET may be coupled to a driver electrode 106 configured to control the activation and deactivation of the MOSFET. (For simplicity, the terminal of the MOSFET coupled to back-plate electrode 104 will be referred to as the MOSFET's drain, and the terminal of the MOSFET coupled to addressing electrode 108 will be referred to as the MOSFET's source. However, one of ordinary skill in the art will recognize that, in some embodiments, the source and drain of the MOSFET may be interchanged.)

In some embodiments of the active matrix, the addressing electrodes 108 of all the pixels in each column may be connected to a same column electrode, and the driver electrodes 106 of all the pixels in each row may be connected to a same row electrode. The row electrodes may be connected to a row driver, which may select one or more rows of pixels by applying to the selected row electrodes a voltage sufficient to activate the non-linear elements 120 of all the pixels 100 in the selected row(s). The column electrodes may be connected to column drivers, which may place upon the addressing electrode 106 of a selected (activated) pixel a voltage suitable for driving the pixel into a desired optical state. The voltage applied to an addressing electrode 108 may be relative to the voltage applied to the pixel's front-plate electrode 102 (e.g., a voltage of approximately zero volts). In some embodiments, the front-plate electrodes 102 of all the pixels in the active matrix may be coupled to a common electrode.

In some embodiments, the pixels 100 of the active matrix may be written in a row-by-row manner. For example, a row of pixels may be selected by the row driver, and the voltages corresponding to the desired optical states for the row of pixels may be applied to the pixels by the column drivers. After a pre-selected interval known as the "line address time," the selected row may be deselected, another row may be selected, and the voltages on the column drivers may be changed so that another line of the display is written.

FIG. 2 shows a circuit model of the electro-optic imaging layer 110 disposed between the front electrode 102 and the rear electrode 104 in accordance with the subject matter presented herein. Resistor 202 and capacitor 204 may represent the resistance and capacitance of the electro-optic imaging layer 110, the front electrode 102 and the rear electrode 104, including any adhesive layers. Resistor 212 and capacitor 214 may represent the resistance and capacitance of a lamination adhesive layer. Capacitor 216 may represent a capacitance that may form between the front electrode 102 and the back electrode 104, for example, interfacial contact areas between layers, such as the interface between the imaging layer and the lamination adhesive layer and/or between the lamination adhesive layer and the backplane electrode. A voltage Vi across a pixel's imaging film 110 may include the pixel's remnant voltage.

Figure 3A:
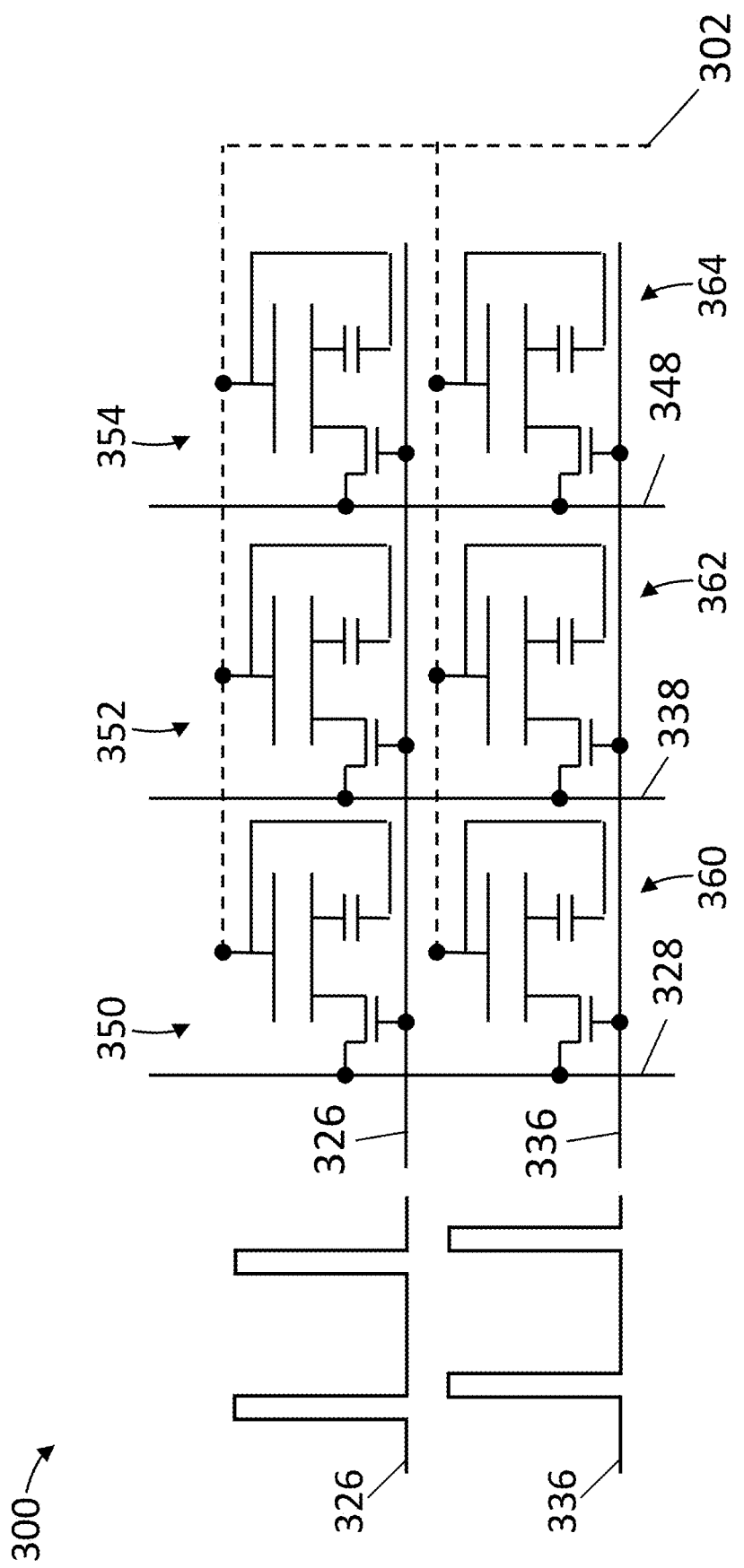
FIG. 3A shows a schematic and signal diagram of an exemplary electro-optic display in accordance with the subject matter presented herein.

FIG. 3A illustrates a schematic and signal diagram 300 of an exemplary electro-optic display in accordance with the subject matter presented herein. Diagram 300 shows a plurality of display pixels (e.g., display pixels 350, 352, 354, 360, 362, and 364) positioned in rows and columns (e.g., an active matrix). Each row of pixels is electrically coupled to a row select line (e.g., row select lines 326 and 336). The row select lines are electrically coupled to the gate electrode of each pixel transistor in a respective row, and are configured to turn on or off the pixel transistors associated with each display pixel. Each column of display pixels is coupled to a source line (e.g., source lines 328, 338, and 348). The source lines are electrically coupled to the source electrode of each pixel transistor in a respective column, and are designed to provide driving voltages to the display pixels. Furthermore, a VCOM line 302 may be electrically coupled to the display's top plane or top electrode to provide a bias voltage which is typically at or around zero volts.

In operation, the row select line voltage is used to control the selection of a row of display pixels for updating. For example, when row select line is driven to a low level gate line voltage ("VEE"), the n-channel pixel transistors in the corresponding row of display pixels are turned off or deactivated, thereby de-selecting that row of display pixels. Conversely, when row select line voltage is driven to a high level gate line ("VDDH"), the n-channel pixel transistors in the corresponding row of display pixels are turned on or activated, thereby selecting that row of display pixels for updating.

Referring to FIG. 3B, when the row select line 326 is high (i.e., driven to VDDH), the corresponding row of display pixels (e.g., display pixels 350, 352, and 354) is selected or turned on for updating. Once the row of display pixels is selected or activated, the voltage applied to the source line 328 is applied to the pixel electrode associated with display pixel 350 through its pixel transistor.

FIG. 3B shows an illustrative frame 390 during which a positive voltage is applied to source line 328, and an illustrative frame 392 during which a negative voltage is applied to source line 328. The voltage applied to VCOM 302 is kept at a constant level while display pixel 350 is being updated. Voltage Vi 370 is the voltage across the electro-optic material based on the potential difference between the voltage applied to the source line 328 and the voltage applied to VCOM 302.

After the display pixel is deselected, a storage capacitor maintains voltage Vi 370 until the pixel is selected again.

However, as discussed above, the amplitude of voltage Vi 370 can be affected by kick-back 375 a short period after the display pixel is deselected. Further, there is some decay in voltage Vi 370 due to current leakage. The amount of kick-back 375 and decay experienced by each display pixel can vary among all the display pixels in the array. Accordingly, the difference in the voltage applied to each display pixel versus the actual voltage Vi 370 that gets applied across the electro-optic material can be unpredictable, and can cause an undesirable mismatch in the optical state of the display from one region to the next.

Figure 4:
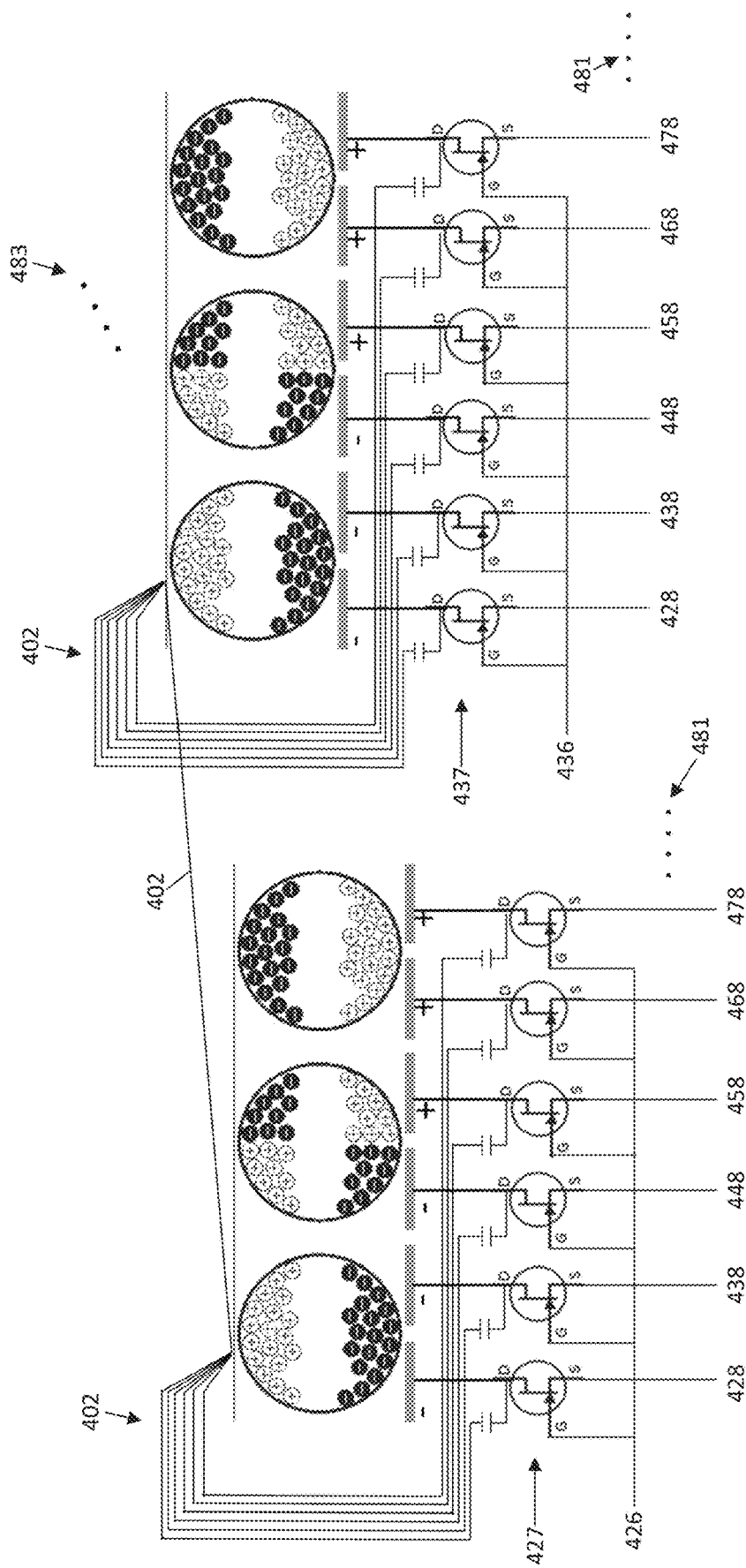
FIG. 4 shows an exemplary schematic diagram of two adjacent rows of display pixels in accordance with the subject matter presented herein.

FIG. 4 shows an exemplary schematic diagram 400 of two adjacent rows of display pixels in accordance with the subject matter presented herein. As described above, for typical active matrix addressing, each row select line is driven high at a different time. For example, row select line 426 is driven high to activate the pixel transistors in row 427, and source lines 428, 438, 448, 458, 468, and 478 provide driving voltages to their respective display pixels using VCOM 402 as a reference. Subsequently, row select line 426 is driven low to deactivate the pixel transistors in row 427, and row select line 436 is driven high to activate the pixel transistors in row 437 while source lines 428, 438, 448, 458, 468, and 478 provide driving voltages to their respective display pixels using VCOM 402 as a reference. Ellipses 481 are included to denote that the array of display pixels can include more than the five source lines shown in FIG. 4. Similarly, ellipsis 483 is included to denote that the array of display pixels can include more than the two rows of display pixels shown in FIG. 4.

VCOM 402 is typically electrically connected to the top plane or top electrode of a display stack, and is also electrically connected to one electrode of each display pixel's storage capacitor. The other electrode of each display pixel's storage capacitor is connected to a respective display pixel electrode, as illustrated in FIG. 4.

For some applications it is desirable to have a large voltage globally applied to all display pixels in the ink stack at the same time. In some embodiments, varying voltages are applied to VCOM 402 because it is typically a common reference for all pixels in the array. This method of switching the module can be referred to as global top-plane switching. To perform global top-plane switching and apply a high voltage across the entirety of the ink stack, the subject matter presented herein provides driving methods for which all the pixel transistors are addressed at about the same time. This can be useful for simultaneously setting the optical state of all the display pixels to a known state.

FIG. 5A shows a schematic of an exemplary electro-optic display including a plurality of display pixels positioned in rows and columns. Each row of pixels is selected by one of row select lines 526, 536, and 546, and the source lines 528, 538, 548 and VCOM 502 apply voltages to the display pixels when selected.

Referring now to FIG. 5B, in some embodiments, the row select lines (e.g., row select lines 526, 536, and 546) are all driven to a high level gate line voltage (e.g., VDDH) at, or at about, the same time to turn on all of the pixel transistors. With all of the pixel transistors activated, the appropriate voltages are applied to the source lines (e.g., source lines 528, 538, 548) and VCOM 502 to create the desired voltage potential across the electro-optic medium. In some embodiments, all of the pixel transistors are turned on within 2 microseconds to 100 microseconds of each other. In some embodiments, all of the pixel transistors are turned on within one frame time of each other. In some embodiments, all of the pixel transistors are turned on within 2 milliseconds to 100 milliseconds of each other.

In some embodiments, activating all of the pixel transistors at the same, or about the same, time can be implemented by accessing functionality in existing row and column drivers associated with the display's controller. For example, driver devices can include an XON pin or XON signal that can be used to cause the driver to globally set the state of all of its outputs to the same value. The XON pin can be configured to instruct the gate driver to switch on (e.g., drive to VDDH) or off (e.g., drive to VEE) all of the row select lines (e.g., row select line 326, row select line 336) at the same time. One of skill in the art will appreciate that there are other methods for activating all of the pixel transistors at about the same time. For example, U.S. Pat. No. 10,475,396 (which is incorporated herein in its entirety) provides examples of such methods in FIGS. 5A-8 and their corresponding descriptions.

In practice, supplying voltages of +v volts to VCOM 502 and −µ volts to the source lines 528, 538, and 548 yields a voltage or potential difference of +(v+µ) volts from the bottom electrode to the top-plane or top electrode. Conversely, supplying voltages of −v volts to VCOM 502 and +µ volts to the source lines 528, 538, and 548 yields a voltage or potential difference of −(v+µ) volts from the bottom electrode to the top-plane or top electrode. Accordingly, driving VCOM 502 and source lines 528, 538, and 548 in this manner enables a driving mode that creates a voltage potential between the bottom electrode and top electrode of the display (and in effect, across the display medium layer or ink layer) that exceeds the maximum voltage that can be applied by either VCOM 502 or the source lines 528, 538, and 548 alone.

As shown in FIG. 5C, in some embodiments, VCOM 502 is capable of being driven to voltages of +30V (e.g., +v), 0V, −30V (e.g., −v) and the source lines 528, 538, and 548 can be driven to voltage of +15V (e.g., +µ), 0V, −15V (e.g., −µ). The following embodiments illustrate how the source and VCOM 502 can be driven to achieve +/−30V and +/−45V differences across the electro-optic medium in both polarity directions using top-plane switching in an active matrix display:

Method 1: From time $t_0$ to time $t_1$, a voltage potential of +45V from the bottom electrode to the top-plane can be created by driving VCOM 502 to +30V and the source lines 528, 538, and 548 to −15V. Conversely, from time $t_1$ to time $t_2$, a voltage potential of −45V from the bottom electrode to the top-plane can be created by driving VCOM 502 to −30V and the source lines 528, 538, and 548 to +15V.

Method 2: From time $t_2$ to time $t_3$, a voltage potential of +30V from the bottom electrode to the top-plane can be created by driving the VCOM 502 to +30V and the source lines 528, 538, and 548 to 0V. Conversely, from time $t_3$ to time $t_4$, a voltage potential of −30V from the bottom electrode to the top-plane can be created by driving VCOM 502 to −30V and the source lines 528, 538, and 548 to 0V.

Using the configurations and techniques presented herein enables global top-plane switching for active matrix displays without the undesired charging or discharging of the pixel storage capacitors experienced when using conventional techniques. For example, all of the display pixels can be selected and driven concurrently with the same voltage which eliminates polarization kick-back and cross-talk from neighboring pixels, and mitigates the pixel voltage decay that otherwise occurs during conventional drive schemes when a display pixel is deselected. Accordingly, using the inventive techniques described herein can minimize or eliminate any disparity between the voltage applied to each display pixel versus the voltage potential that is actually created across the electro-optic material. This can prevent an undesirable mismatch in the optical state of the display from one region of display pixels to the next.

Further, the inventive techniques described herein enable voltages exceeding the maximum voltage either VCOM or the source lines can apply alone to be applied to the display pixels. This increases the electric field that can be applied to the electro-optic material which can increase the velocity at which the charged ink particles move within the fluid, thereby reducing the time required to drive all of the display pixels to an extreme optical state. This can be useful for simultaneously setting the optical state of all the display pixels to a known state. One useful application of this feature is as a global reset that sets the optical state of all the display pixels in a display module to a known state in the shortest amount of time. For example, the techniques described herein can be used to drive all pixels to an extreme optical state such as black or white.

It will be apparent to those skilled in the art that numerous changes and modifications can be made to the specific embodiments of the invention described above without departing from the scope of the invention. Accordingly, the whole of the foregoing description is to be interpreted in an illustrative and not in a limitative sense.

The invention claimed is:

1. A method of driving an electro-optic display comprising a layer of electro-optic material disposed between a common electrode and a backplane, the backplane including an array of pixel electrodes, wherein each pixel electrode is coupled to a pixel transistor including a source electrode, a gate electrode, and a drain electrode, wherein the gate electrode is coupled to a gate line, the source electrode is coupled to a source line, and the drain electrode is coupled to the pixel electrode, wherein a controller provides time-dependent voltages to the gate line, the source line, and the common electrode, the method of driving comprising:
applying a first voltage to the common electrode, wherein the first voltage has a first amplitude that is the maximum voltage the controller is capable of applying to the common electrode;
applying a second voltage to the source line of every pixel transistor, wherein the second voltage has a second amplitude that is the maximum voltage the controller is capable of applying to the source line of every pixel transistor, and wherein the second voltage has a polarity opposite of the first voltage; and
concurrently applying a high level gate line voltage sufficient to activate the pixel transistor to the gate line of every pixel transistor, thereby applying a third voltage across the electro-optic material, wherein the third voltage is the same voltage applied to all of the pixel electrodes, and wherein the third voltage has a third amplitude sufficient to drive the optical state of the electro-optic display to a first extreme optical state.

2. The method of claim 1 wherein the first voltage has a positive polarity and the second voltage has a negative polarity.

3. The method of claim 1 wherein the first voltage has a negative polarity and the second voltage has a positive polarity.

4. The method of claim 1 wherein the third voltage has a magnitude of substantially 30V.

5. The method of claim 1 wherein the third voltage has a magnitude of substantially 45V.

6. The method of claim 1 wherein the first extreme optical state is one of white and black.

7. The method of claim 1 further comprising:
concurrently applying a low level gate line voltage sufficient to deactivate the pixel transistor to the gate line of every pixel transistor;
applying a fourth voltage to the common electrode, wherein the fourth voltage has a fourth amplitude that is the maximum voltage the controller is capable of applying to the common electrode;
applying a fifth voltage to the source line of every pixel transistor, wherein the fifth voltage has a fifth amplitude that is the maximum voltage the controller is capable of applying to the source line of every pixel transistor, and wherein the fifth voltage has a polarity opposite of the second voltage and the fourth voltage; and
concurrently applying the high level gate line voltage sufficient to activate the pixel transistor to the gate line of every pixel transistor, thereby applying a sixth voltage across the electro-optic material, wherein the sixth voltage has a sixth amplitude sufficient to drive the optical state of the electro-optic display to a second extreme optical state.

8. The method of claim 7 wherein the second extreme optical state is one of white and black, and wherein the second extreme optical state is the opposite of the first extreme optical state.

9. The method of claim 7 wherein the sixth voltage has a magnitude of substantially 30V.

10. The method of claim 7 wherein the sixth voltage has a magnitude of substantially 45V.

11. An electro-optic display comprising:
a light-transmissive common electrode;
a backplane including an array of pixel electrodes;
a layer of electro-optic material disposed between the common electrode and the array of pixel electrodes, wherein each pixel electrode is coupled to a pixel transistor including a source electrode, a gate electrode, and a drain electrode, and wherein the gate electrode is coupled to a gate line, the source electrode is coupled to a source line, and the drain electrode is coupled to the pixel electrode;
a controller capable of applying time-dependent voltages to the gate line, the source line, and the common electrode, the controller configured to:
apply a first voltage to the common electrode, wherein the first voltage has a first amplitude that is the maximum voltage the controller is capable of applying to the common electrode;
apply a second voltage to the source line of every pixel transistor, wherein the second voltage has a second amplitude that is the maximum voltage the controller is capable of applying to the source line of every pixel transistor, and wherein the second voltage has a polarity opposite of the first voltage; and
concurrently apply a high level gate line voltage sufficient to activate the pixel transistor to the gate line of every pixel transistor, thereby applying a third voltage across the electro-optic material, wherein the third voltage is the same voltage applied to all of the pixel electrodes, and wherein the third voltage has a third amplitude sufficient to drive the optical state of the electro-optic display to a first extreme optical state.

12. The electro-optic display of claim 11 wherein the first voltage has a positive polarity and the second voltage has a negative polarity.

13. The electro-optic display of claim 11 wherein the first voltage has a negative polarity and the second voltage has a positive polarity.

14. The electro-optic display of claim 11 wherein the third voltage has a magnitude of substantially 30V.

15. The electro-optic display of claim 11 wherein the third voltage has a magnitude of substantially 45V.

16. The electro-optic display of claim 11 wherein the first extreme optical state is one of white and black.

17. The electro-optic display of claim 11 wherein the controller is further configured to:
   concurrently apply a low level gate line voltage sufficient to deactivate the pixel transistor to the gate line of every pixel transistor;
   apply a fourth voltage to the common electrode, wherein the fourth voltage has a fourth amplitude that is the maximum voltage the controller is capable of applying to the common electrode;
   apply a fifth voltage to the source line of every pixel transistor, wherein the fifth voltage has a fifth amplitude that is the maximum voltage the controller is capable of applying to the source line of every pixel transistor, and wherein the fifth voltage has a polarity opposite of the second voltage and the fourth voltage; and
   concurrently apply the high level gate line voltage sufficient to activate the pixel transistor to the gate line of every pixel transistor, thereby applying a sixth voltage across the electro-optic material, wherein the sixth voltage has a sixth amplitude sufficient to drive the optical state of the electro-optic display to a second extreme optical state.

18. The electro-optic display of claim 17 wherein the second extreme optical state is one of white and black, and wherein the second extreme optical state is the opposite of the first extreme optical state.

19. The electro-optic display of claim 17 wherein the sixth voltage has a magnitude of substantially 30V.

20. The electro-optic display of claim 17 wherein the sixth voltage has a magnitude of substantially 45V.

* * * * *